UNITED STATES PATENT OFFICE.

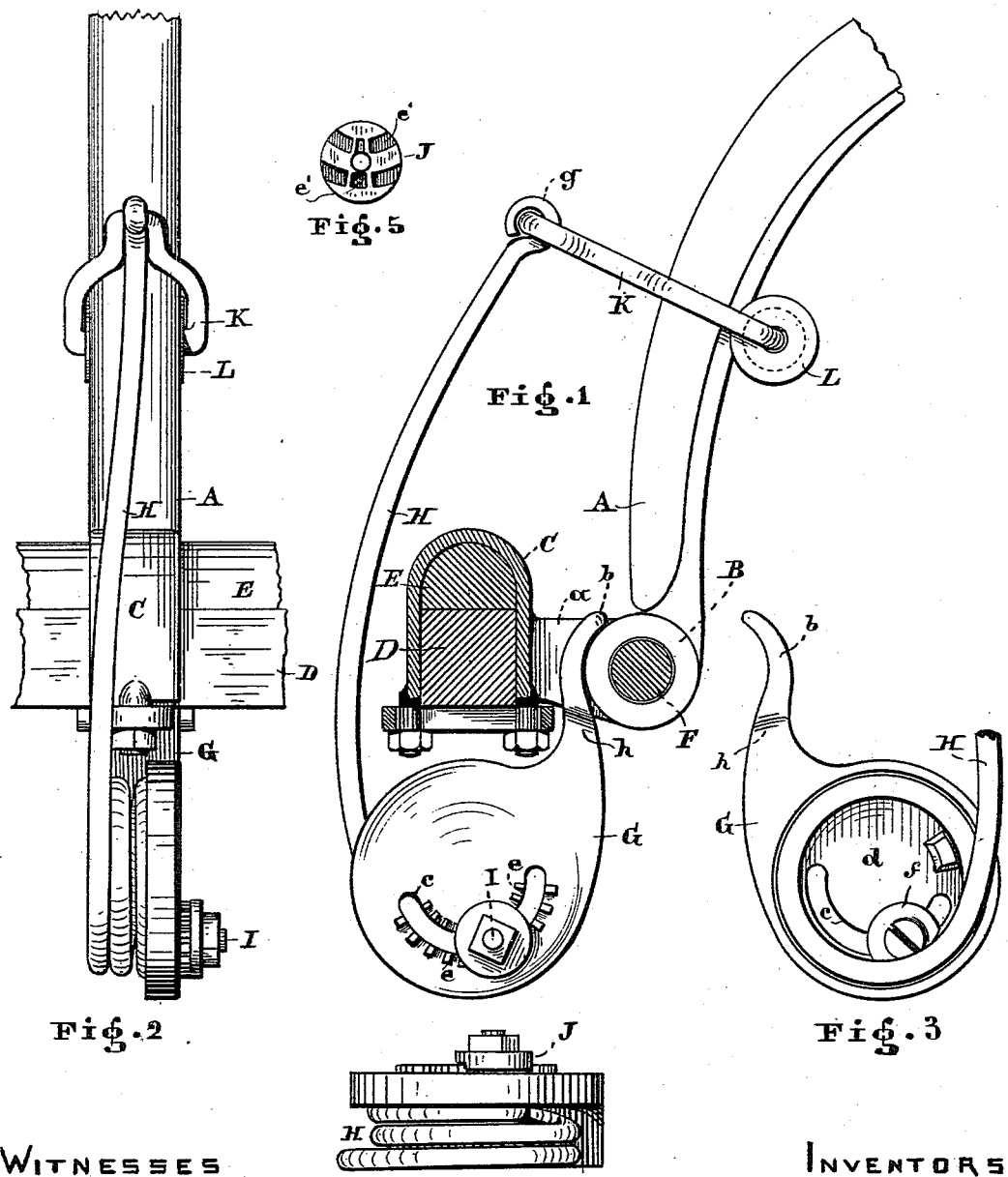

CHARLES BISHOP, OF CLEVELAND, AND OLIVER D. MILLER, OF BROOKLYN, OHIO.

THILL-COUPLING.

SPECIFICATION forming part of Letters Patent No. 420,032, dated January 28, 1890.

Application filed October 9, 1889. Serial No. 326,407. (No model.)

*To all whom it may concern:*

Be it known that we, CHARLES BISHOP, of Cleveland, in the county of Cuyahoga and State of Ohio, and OLIVER D. MILLER, of Brooklyn, in the county of Cuyahoga and State of Ohio, both citizens of the United States, have invented new and useful Improvements in Vehicle Spring Shaft-Supporters and Anti-Rattler Coupling Attachments; and we do hereby declare that the following is a full, true, and exact description thereof.

Our invention relates to a spring mechanism for supporting buggy or vehicle shafts, which is arranged in contact with the coupling of said shaft or thills, and to prevent the latter from rattling.

The improvement consists more particularly in the construction of said device, which admits of a ready and effective adjustment of its parts in relation to the shaft and the coupling thereof.

That the invention may be fully seen and understood reference will be had to the following specification and accompanying drawings, in which—

Figure 1 illustrates a sectional view of a buggy-axle and shaft-coupling provided with the said invention. Fig. 2 is a side view of the same. Fig. 3 is a reverse view of a part of Fig. 1. Fig. 4 represents an under side view of Fig. 3; and Fig. 5 is a face view of a clutch-washer used in connection with said invention, as hereinafter described.

Like letters of reference denote like parts in the drawings and specification.

In Fig. 1, A represents the shaft or thill, B its coupling-joint, and C the clip embracing the axle D and its re-enforcement E. The joint B is coupled to the lug $a$ of said clip by means of the bolt F, and between said joint and clip is interposed the neck $b$ of the adjusting tension-plate G, which is arranged in co-operative relation with the spring H by means of the bolt I, Figs. 1 and 2, and the concentric slot $c$. (Seen in Figs. 1 and 3.) On one side of said plate G is a depression or cavity $d$, to inclose partly the coiled or spiral end of the spring H, whereas the other side has a series of radial projections $e$ around the sides of the slot $c$, which engage corresponding depressions $e'$ of the clutch-washer J, (see Figs. 4 and 5,) to prevent the latter from slipping when once set to hold the bolt I with spring and plate in place. The spring H has an eye $f$ formed at the coiled end thereof for connection with the bolt I and adjustable attachment to the plate G, as seen in Figs. 1 and 3. The upper end $g$ of said spring carries loosely the loop K with roller L, which is arranged to bear upon the inner side of the shaft A, and thereby exerts the force of the said spring upon said shaft for support thereof. According to the relative adjustment of the said spring H and plate G the said shafts can be carried high or low, as may be desired, while the neck of the plate G bears at all times upon the joint B and prevents rattling with its axle-clip connections C. There are shoulders at $h$, formed on the neck or extension of said plate G, which bear on the under side of the coupling-lugs $a$, as seen in Fig. 1, which prevents the said plate from being moved up out of position in relation to the coupling, whereby the shaft or thills are supported by the spring H in connection with the said plate, in the manner hereinbefore described.

In applying the said invention to practical use two (or duplicates) are used in supporting the thills. One of the two has been considered sufficient to set forth the nature of the improvement.

What I claim, and desire to secure by Letters Patent, is—

1. The combination, with vehicle-shafts and the coupling thereof, the plate G, provided with a neck $b$, a concentric slot $c$, with radial projections $e$ around the sides thereof and a cavity in the face opposite said projections, of the spring H, having a coil with eye at one end and a loop with roller at the other, and provided with means for securing a movable washer adjustably to said plate, constructed and arranged substantially as and for the purposes set forth.

2. In combination, the vehicle-shaft support and anti-rattler, consisting of a plate G, having a neck $b$, a cavity $d$, and a concentric slot $c$, the spring H, having an eye at one end and a loose connection with the thills at the other, and a bolt with a clutch-washer to fit the projections *e* of said plate, constructed and arranged substantially as and for the purpose set forth.

3. The plate G, having a shouldered neck extending up between the coupling-joint and clip, a concentric slot *c*, with projections *e*, a movable clutch-washer fitted to said projections, a spring arranged in connection with said plate and provided with adjustable means for securing the said parts together and the required tension of the spring, in combination with vehicle-thills and coupling thereof, substantially as shown and described.

In testimony whereof we affix our signatures in presence of two witnesses.

CHARLES BISHOP.
OLIVER D. MILLER.

Witnesses:
W. H. BURRIDGE,
W. A. BIDDLE.